(12) United States Patent
Shi et al.

(10) Patent No.: US 9,024,549 B2
(45) Date of Patent: May 5, 2015

(54) OVER-TEMPERATURE PROTECTION CIRCUIT FOR POWER DEVICES

(75) Inventors: Pingbo Shi, Nanjing (CN); Dezhong Yang, Nanjing (CN)

(73) Assignee: Chervon (HK) Limited, Hong Kong (HK)

(*) Notice: Subject to any disclaimer, the term of this patent is extended or adjusted under 35 U.S.C. 154(b) by 846 days.

(21) Appl. No.: 13/245,260

(22) Filed: Sep. 26, 2011

(65) Prior Publication Data

US 2012/0074877 A1    Mar. 29, 2012

(30) Foreign Application Priority Data

Sep. 26, 2010   (CN) .......................... 2010 1 0292359

(51) Int. Cl.
*H02P 1/00* (2006.01)
*H02P 29/00* (2006.01)
*H02P 29/02* (2006.01)

(52) U.S. Cl.
CPC .......... *H02P 29/0055* (2013.01); *H02P 29/022* (2013.01)

(58) Field of Classification Search
USPC ....................................................... 318/139
See application file for complete search history.

(56) References Cited

U.S. PATENT DOCUMENTS

| | | | |
|---|---|---|---|
| 5,416,399 A * | 5/1995 | Brunson ...................... | 318/778 |
| 6,172,860 B1 * | 1/2001 | Yoshimizu et al. ............. | 361/25 |
| 2003/0141767 A1 * | 7/2003 | Roepke et al. ................ | 307/117 |
| 2003/0187485 A1 * | 10/2003 | Sturman et al. ................. | 607/72 |
| 2006/0220605 A1 * | 10/2006 | Funabashi et al. ............ | 318/434 |
| 2007/0252558 A1 * | 11/2007 | Kawano et al. ................ | 320/132 |
| 2008/0048000 A1 * | 2/2008 | Simonelli et al. ............. | 227/132 |
| 2009/0039813 A1 * | 2/2009 | Yamada et al. ................ | 318/434 |
| 2009/0224703 A1 * | 9/2009 | Woods et al. ................... | 318/17 |
| 2010/0002744 A1 * | 1/2010 | Sheahan ......................... | 374/1 |
| 2010/0026225 A1 * | 2/2010 | Kamei et al. .................. | 318/471 |
| 2010/0117580 A1 * | 5/2010 | Miwa et al. ................... | 318/472 |
| 2010/0117581 A1 * | 5/2010 | Miwa et al. ................... | 318/472 |
| 2010/0141186 A1 * | 6/2010 | Katzenberger et al. ........ | 318/139 |
| 2010/0195354 A1 * | 8/2010 | Lin .............................. | 363/21.01 |
| 2011/0012564 A1 * | 1/2011 | Yang et al. .................... | 320/162 |
| 2011/0030980 A1 * | 2/2011 | Ho .................................. | 173/1 |
| 2012/0193113 A1 * | 8/2012 | Ho .................................. | 173/1 |

* cited by examiner

Primary Examiner — Kawing Chan
(74) Attorney, Agent, or Firm — Greenberg Traurig, LLP

(57) ABSTRACT

An over-temperature protection circuit for a direct current (DC) electric tool includes a current detecting circuit electrically coupled to a battery pack, a power device control circuit electrically coupled to an electric motor of the DC electric tool and a power device for controlling the power state of the circuit. A computation control circuit controls the power supply of the motor according to the circuit current value detected by the current detecting circuit. When the electric motor is not in a speed control state, the allowable current passing through the over-temperature protection circuit of the DC electric tool cannot exceed a preset first current value. When the electric motor is in the speed control state, the allowable current passing through the over-temperature protection circuit of the DC electric tool cannot exceed a preset second current value less than the first current value.

18 Claims, 3 Drawing Sheets

OVER-TEMPERATURE PROTECTION CIRCUIT FOR POWER DEVICES

CROSS REFERENCE TO RELATED APPLICATION

This application claims the benefit of CN 201010292359.2, filed on Sep. 26, 2010, the disclosure of which is incorporated herein by reference in its entirety.

FIELD OF THE DISCLOSURE

The present disclosure relates to an over-temperature protection circuit for direct current (DC) electric tools, and more particularly to an over-temperature protection circuit for power devices in DC electric tools.

BACKGROUND OF RELATED ART

Generally, most DC electric tools have speed control functions, and their operating currents are relatively larger. Control devices for DC electric tools are usually power devices like insulated gate bipolar transistor (IGBT), metal-oxide-semiconductor field-effect transistor (MOSFET), etc. Speed control by a larger current will certainly result in rapid heating of the power device, and furthermore the fast rising operating temperature will result in rapid overheating failure of the power device. Currently in order to prevent a power device from overheating, a usual means for measuring the real time temperature is adopted to monitor the temperature by mounting a temperature measurement element on the outside of the power device.

Because heat transferring between objects is a slow procedure, this factor results in that the temperature sampled from practical applications always lags behind the actual operating temperature of the power device. When examining the temperature control of the power devices, the following situations are typically observed:

1) The significant heater of a power device is typically the inner core thereof, and therefore a time lag phenomenon exists during heat transferring from the inner core to the periphery of the power device.

2) Typically, only when the temperature of the whole body of a temperature measurement element reaches the temperature to be measured, can its featured resistance be truly consistent with the temperature to be measured. But a time lag phenomenon exists before the temperature of the whole body of the temperature measurement element reaches to a certain temperature.

3) If a packaged temperature measurement element is mounted on the packaged body or heatsink of a power device, there is a time lag phenomenon of the temperature measurement because the thermal conductivity of the package material of the power device or the temperature measurement element is lower.

4) If the package shape of a temperature measurement element does not closely correspond to the shape of a power device, there exists an air gap therebetween after installation, and because the thermal conductivity of air is lower, a significant time lag phenomenon of the temperature measurement exists. It is oftentimes necessary to fill the thermally conductive material in the gap to improve the thermal conductivity between the temperature measurement element and the power device, but a time lag phenomenon still exists. Moreover, the operation for filling the thermally conductive material into the gap has some uncertainties such that the thermal conductivities of the temperature measurement element and the power device are not consistent with each other in mass production, thus increasing the difficulty of the temperature compensation.

5) According to the internal structure of a power device, the temperature of its heatsink is closer to that of the inner core. When a temperature measurement element is mounted to the heatsink of the power device, as the heatsink of the power device usually has an electric network, the temperature measurement element has to be electrically isolated from the heatsink of the power device, which lowers the thermal conductivity between the temperature measurement element and the power device. As a result, the measured temperature lags the actual temperature of the power device.

Due to the above observed phenomena, the external temperature measurement element can not accurately track the core temperature change of the power device in real time and the real-time monitoring is insufficient for some situations, which may result in the inability to shut down the power device in time and may result in the overheating failure of the power device.

SUMMARY

In order to overcome the disadvantages and drawbacks in the prior art, the present disclosure proposes, among other things, an over-temperature protection circuit for the power devices in DC electric tools to mitigate the effect of the above problems, and also proposes an electric tool using such circuit.

To this end, in one example, the present disclosure provides an over-temperature protection circuit applicable for a DC electric tool, including a current detecting circuit electrically connecting to a battery pack and detecting the current in the circuit, a power device control circuit electrically connecting to an electric motor of the DC electric tool and comprising a power device for controlling on/off of the circuit, and a computation control circuit for controlling the power supply of the motor according to the current value detected by the current detecting circuit. When the electric motor is not in the speed control state, the allowable current passing through the over-temperature protection circuit of the DC electric tool cannot exceed a first preset current value. When the electric motor is in the speed control state, the allowable current passing through the over-temperature protection circuit of the DC electric tool in a preset period of time cannot exceed a second preset current value, wherein the second current value is less than the first current value.

In at least one embodiment, the over-temperature protection circuit of the DC electric tool is combined with MCU software control to predict whether the overheating phenomenon will appear during the operation of the power device, so as to shut down the power device quickly and effectively lower the risk of the overheating failure of the power device.

In addition, in one example, the present disclosure uses only existing current sampling circuits, without increasing extra hardware cost.

Meanwhile, the over-temperature protection circuit of the DC electric tool according to an example of the present disclosure is combined with the conventional measures like as the over-temperature protection by means of measuring the outside temperature and the over current protection etc, so as to protect the power device more effectively and improve the lifetime of the tool.

BRIEF DESCRIPTION OF THE DRAWINGS

The present disclosure will be further explained with the accompanying drawings, wherein.

DETAILED DESCRIPTION

Figure 1:
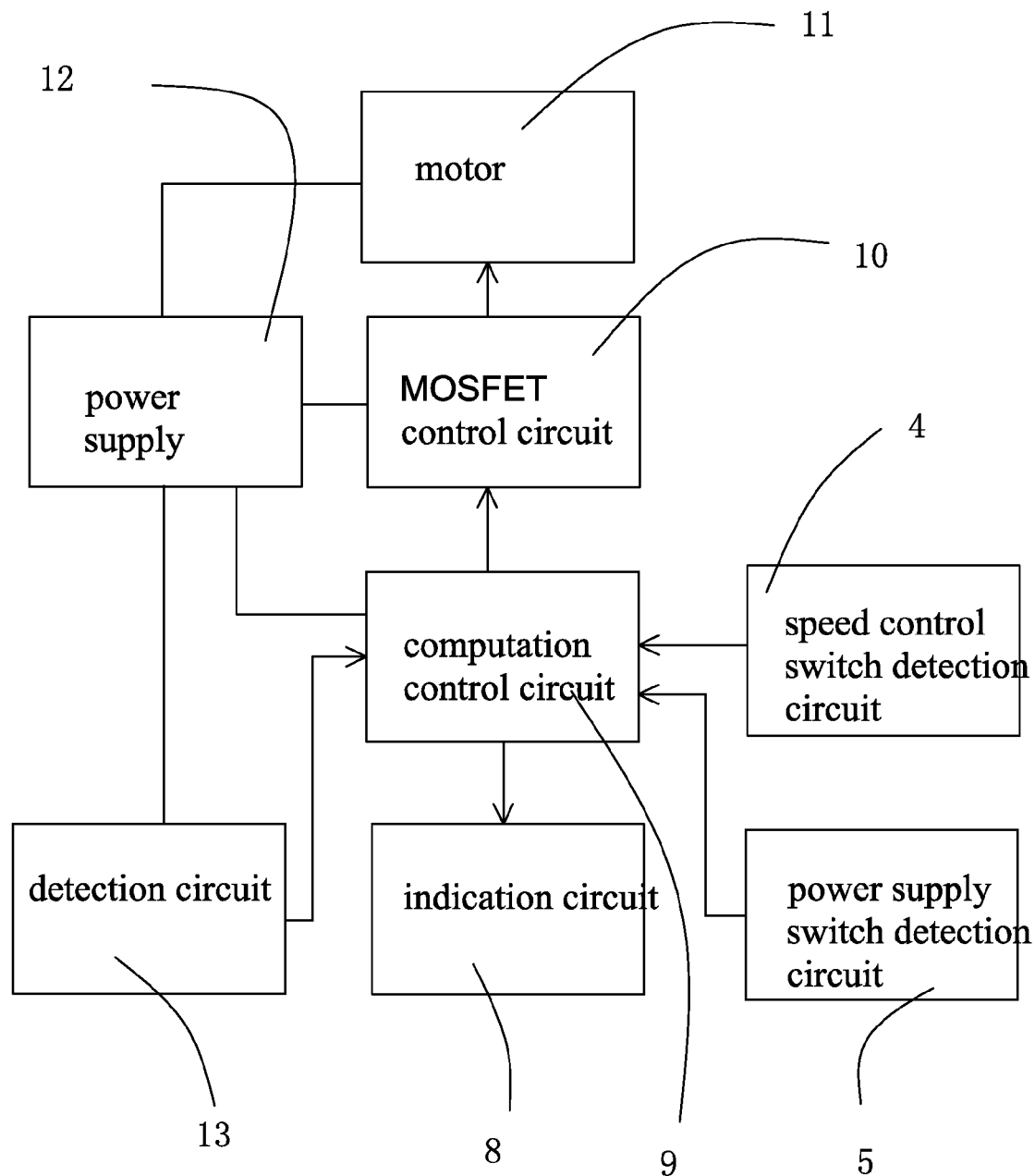
FIG. 1 is a circuit module diagram of an over-temperature protection circuit for a DC electric tool according to an example of the present disclosure.

The present disclosure will be described in detail by various examples in conjunction with the accompanying drawings as follows.

Under normal operating conditions, a direct current (DC) electric tool comprises a motor installed in a housing, a switch, and a battery pack comprising multiple rechargeable batteries for providing power for the electric tool.

The DC electric tool has speed control function, which is realized by different average currents obtained in the coils of the DC electric motor by modulating the PWM duty cycle represented by on and off of the power device. The power device can be IGBT, MOSFET, and SCR etc. In the present disclosure, MOSFET is described.

The heating power of a MOSFET is also the power loss thereof, mainly comprising the conductive loss and the switching loss, while the switching loss comprises the turn-on loss and the turn-off loss, wherein:

The conductive loss: $P_{(conduct)} = I_{pk}^2 \times R_{DS(on)} \times D$  equation 1

Wherein $$D = \frac{T_{ON}}{T}$$  equation 2

Because there is relatively larger electric motor coil inductance when the MOSFET turns on, in the operation process of the MOSFET from the turn-off state to the completely turn-on state, the current passing through the MOSFET is tiny, and as a result the turn-on loss can be neglected.

The turn-off loss:

$$P_{(off)} = \frac{1}{2} \times V_{clamp} \times I_{pk} \times T_{off} \times F_{sw}$$  equation 3

Wherein $V_{clamp}$ is the clamp voltage when the MOSFET is turned off (battery voltage E+ coil inductance L*di/dt), $T_{off}$ is the turn-off time of the MOSFET, Fsw is the PWM frequency.

When the MOSFET operates in the PWM state, the actual measurement data are: $I_{pk}$=10 A, $R_{DS(on)}$=5 mohm, D=80%, $V_{clamp}$=24V, $T_{off}$=20 us, Fsw=9.7 kHz, the power loss of the MOSFET is $P_{(conduct)}+P_{(off)}$=0.4 W+24 W=24.4 W;

When the MOSFET operates in the constant turn-on state, D in equation 1 is equal to 1, and its loss is 0.5 W.

That is to say, when the MOSFET operates with a larger current, the heating power of the MOSFET in the PWM state is much higher than that of the MOSFET in the constant turn-on state. If the MOSFET operates in the speed control state, the core temperature goes higher with faster rising rate. As mentioned in the technical background, due to various thermal resistances exist between the MOSFET and the temperature measurement element, it is difficult to effectively reflect the operating temperature change of the MOSFET in time with the conventional external temperature measurement method.

It can be determined from equation 1 and equation 3 that, in a given speed control circuit of a DC electric motor, the PWM frequency and the turn-off time of the MOSFET are both determined, and then $I_{pk}$ is the key to the MOSFET power loss.

Therefore, in the present example, the sampled current value during the operation of the MOSFET is not only used in the over current protection, but also in the prediction for the over-temperature protection of the MOSFET. The sampled current value may be integrated by time so as to shut down the MOSFET in time according to a threshold.

There are 3 thresholds, wherein: when the MOSFET operates in the constant turn-on state, the threshold is $I_{(ALL\_ON)}$; when the MOSFET operates in the constant PWM state, the threshold is $I_{(PWM)}$; and the maximum current threshold of the MOSFET is $I_{(OVER\_CURRENT)}$.

In normal situation, the power loss of the MOSFET in the speed control state is greater than that of the MOSFET in the constant turn-on state, therefore, $I_{(OVER\_CURRENT)} > I_{(ALL\_ON)} > I_{(PWM)}$.

The circuit module diagram of an over-temperature protection circuit for a DC electric tool according to an embodiment of the present disclosure is shown in FIG. 1, which comprises a power supply 12, a motor 11, a power device control circuit 10, a detection circuit 13, a computation control circuit 9, an indication circuit 8, a speed control switch detection circuit 4, and a power supply switch detection circuit 5.

During the operation of the circuit, the power supply 12 provides the power to the motor 11, while it also provides the power to the power device control circuit 10 by a voltage boost circuit, and to the computation control circuit 9 by a voltage buck circuit. The detection circuit 13 comprises a temperature detection circuit for measuring the temperature of the battery pack and the MOSFET, a current detecting circuit for detecting the discharge current, and a voltage detecting circuit for detecting the battery pack voltage. The detection circuit 13 feeds back the detection data related to the power supply 12 to the computation control circuit 9. Meanwhile, the control signals of the speed control switch detection circuit 4 and the power supply switch detection circuit 5 are also sent to the computation control circuit 9.

When the control signals of the speed control switch detection circuit 4 and the power supply switch detection circuit 5 as well as the signals related to the power supply detected by the detection circuit 13 have been computed and determined by the computation control circuit 9, the control signals indicating the electric quantity and the abnormal situation are output to the indication circuit 8, and the MOSFET control signal is sent to the MOSFET control circuit 10 to control the power supply of the motor 11 by controlling on/off of the MOSFET control circuit.

Meanwhile, the computation control circuit 9 comprises a MCU which has functions such as computation, judging, controlling, and related peripheral circuits. The MCU can also be replaced by other microcontrollers such as CPU, ARM etc. The MCU compares, computes, and judges the data of voltage, current, battery temperature, MOSFET temperature etc. detected by the battery pack detection circuit 13 with respect to the preset voltage value, preset current value, preset battery temperature, and preset MOSFET temperature. Then, the MCU feeds back the judged and computed control signals to the MOSFET control circuit 10 and the indication circuit 8, so as to control the operation of the motor 11 and the display condition of the indication circuit 8. The detailed comparison, computation, and judging procedures will be described hereinbelow.

Figure 2:
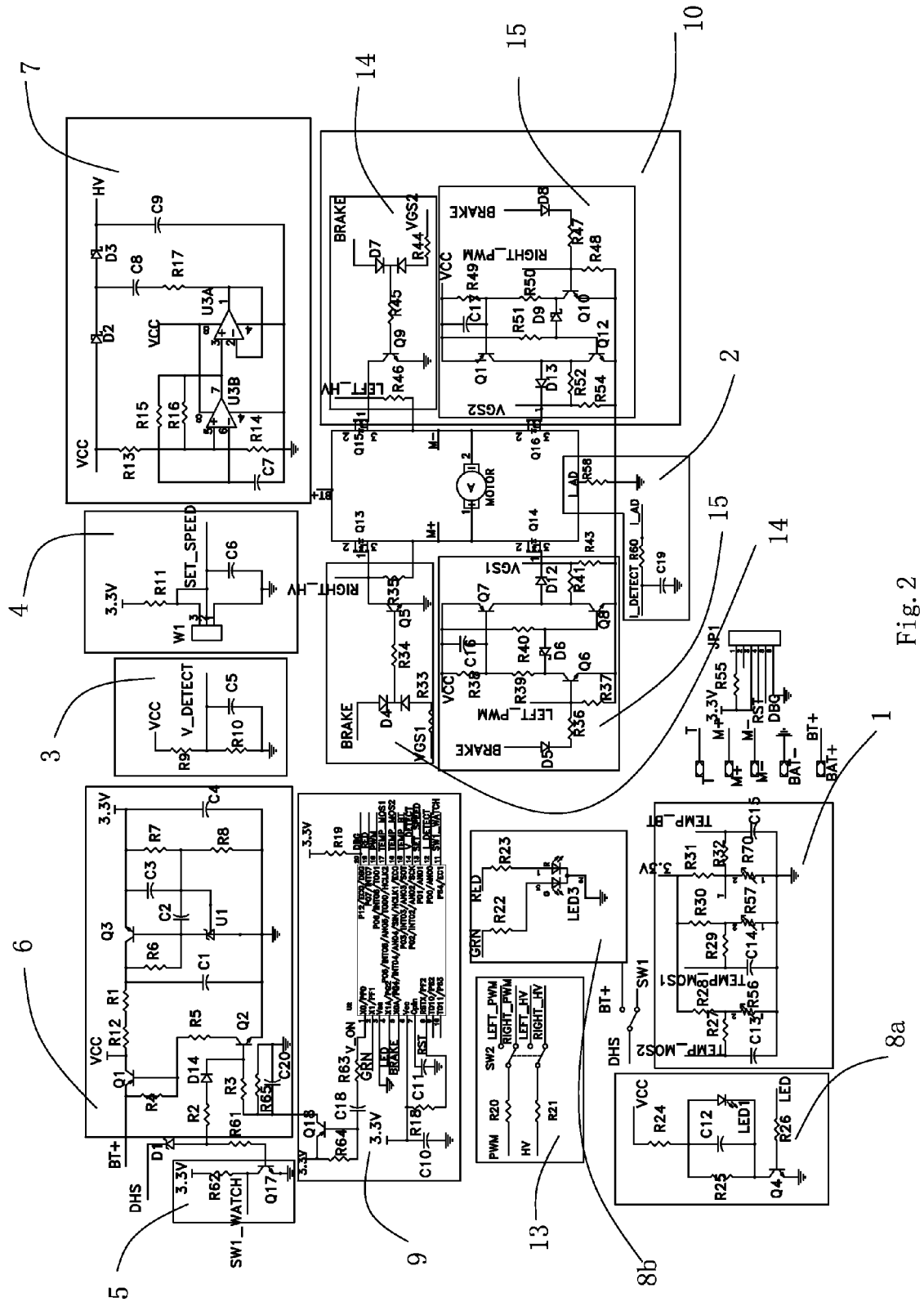
FIG. 2 is a circuit diagram of the over-temperature protection circuit for the DC electric tool according to the example of FIG. 1.

FIG. 2 is a circuit diagram of the over-temperature protection circuit for the DC electric tool according to the embodiment of the present disclosure. It comprises a temperature detection circuit 1 for detecting the temperatures of the battery and the MOSFET, a current detecting circuit 2 for detecting the current, a battery voltage detecting circuit 3, a speed control switch detection circuit 4 for detecting the input signal of the speed control switch, a power supply switch detection circuit 5 for detecting the input signal of the power supply switch, a computation control circuit 9, a MOSFET control circuit 10, a voltage buck circuit 6 for providing a voltage dropping power supply to the computation control circuit 9, a voltage boost circuit 7 for providing a voltage boosting power supply to the MOSFET control circuit 10, and an indication circuit 8 for providing the electric quantity indication and the illuminating indication to the users.

In the circuit, the MOSFETs functioning as switches are the upper transistors Q13, Q15 and the lower transistors Q14, Q16. The detected and controlled current, temperature and other coefficients of the MOS transistor in the present disclosure are also related to the above four MOSFETs. When a reversing switch 16 inputs a positive rotation signal, the motor may rotate positively, and the MOSFETs Q15, Q14 conduct with each other. When the reversing switch 16 inputs a counter-rotation signal, the motor may rotate reversely, and the MOSFETs Q13, Q16 conduct with each other.

The detection circuit 13 comprises the temperature detection circuit 1, the current detecting circuit 2, and the voltage detecting circuit 3.

In the example temperature detection circuit 1, the thermal resistors R56 and R57 are located near to the MOSFETs for detecting the temperatures of the MOSFETs, and the thermal resistor R70 is located near to the battery pack for detecting the temperature of the battery, wherein R56 is used to detect the temperatures of the upper transistors Q13, Q15 and R57 is used to detect the temperatures of the lower transistors Q14, Q16. The resistance values of the thermal resistors may vary with the temperature change, so that the temperature change can be reflected from the resistance values.

In the current detecting circuit 2, R56 is a current sampling resistor. By detecting the voltage across of R56 and inputting it into the MCU to compute, the circuit current can be obtained.

In the voltage detecting circuit 3, by detecting the voltage across of the resistor R10, the battery voltage can be obtained by means of the computation of the MCU with voltage division principle.

The speed control switch detection circuit 4 makes the detection and outputs the control signal to the MCU for judging whether the electric tool is in the speed control state. The power supply switch detection circuit 5 makes the detection and outputs the control signal to the MCU for judging whether the electric tool is turned on.

The computation control circuit 9 comprises the MCU for computation and other peripheral circuits. The voltage buck circuit 6 provides a dropping voltage from the power supply to the battery pack, so as to provide an appropriate power supply to the computation control circuit 9.

The MOSFET control circuit 10 comprises an upper transistor control circuit 14 and a lower transistor control circuit 15. During the operation of the MOSFET control circuit 10, taking the right side as an example, if Q10 is on, then Q11 is on, Q12 is off, and Q16 is on. At the same time, because VGS2 outputs high voltage level, Q9 is on, and Q15 is off; vise verse, if Q10 is off, Q15 is on. Therefore, both the upper transistor control circuit 14 and the lower transistor control circuit 15 generate interlocked signals, so as to ensure that the MOSFETs on the same side, i.e. Q15 and Q16, as well as Q13 and Q14, cannot conduct current simultaneously. The voltage boost circuit 7, which connects to the MOSFET control circuit 10, boosts the voltage provided by the battery, so as to provide the appropriate operating voltage for the upper transistors Q13 and Q15.

The indication circuit 8 comprises an illuminating indication circuit 8*a* and an electric quantity indication circuit 8*b*. The illuminating indication circuit 8*a* includes a white light light-emitting diode (LED) light LED1, which works according to the illuminating control signal output from the MCU. When the circuit operates normally, the MCU continuously outputs the high voltage level, and LED1 is always on; when the battery temperature or the MOS temperature is over-temperature, the MCU outputs the alternate high and low voltage levels for a long period, LED1 flashes slowly; when the battery is overvoltage or the current exceeds the preset current value, the MCU outputs the alternate high and low voltage levels for a shorter period, and LED1 flashes quickly. In the power indication circuit 8*b*, a dual color LED light LED3 which is a red/green dual color LED is used. When the battery voltage is normal, the MCU outputs the high voltage level to the pin 1, and outputs the low voltage level to the pin 3, in this case, only the green light is on; when the battery voltage is lower, the MCU outputs the high voltage level to both the pin 1 and the pin 3, and both the red and green lights are on, so as to display the yellow color; when the battery voltage is too lower, the MCU outputs the low voltage level to the pin 1, and outputs the high voltage level to the pin 3, and then the red light is on.

When the electric tool is in the speed control state, taking the positive rotation of the motor as an example, the upper transistor control circuit 14 applies the driving voltage to the upper transistor Q15, and outputs the high voltage level to turn on Q15. The lower transistor control circuit 15 sends the boosted driving voltage to the lower transistor Q14, and outputs the speed control signal from the MCU to Q14. The speed control function of the electric tool is realized by changing the duty cycle of a PWM signal. When the electric tool is in the medium speed state, the PWM signal is a square signal with a constant period; when the electric tool is in the low speed state, the period of the square signal becomes shorter; and when the electric tool is in the high speed state, the PWM signal is a high level signal with increasing amplitude.

Figure 3:
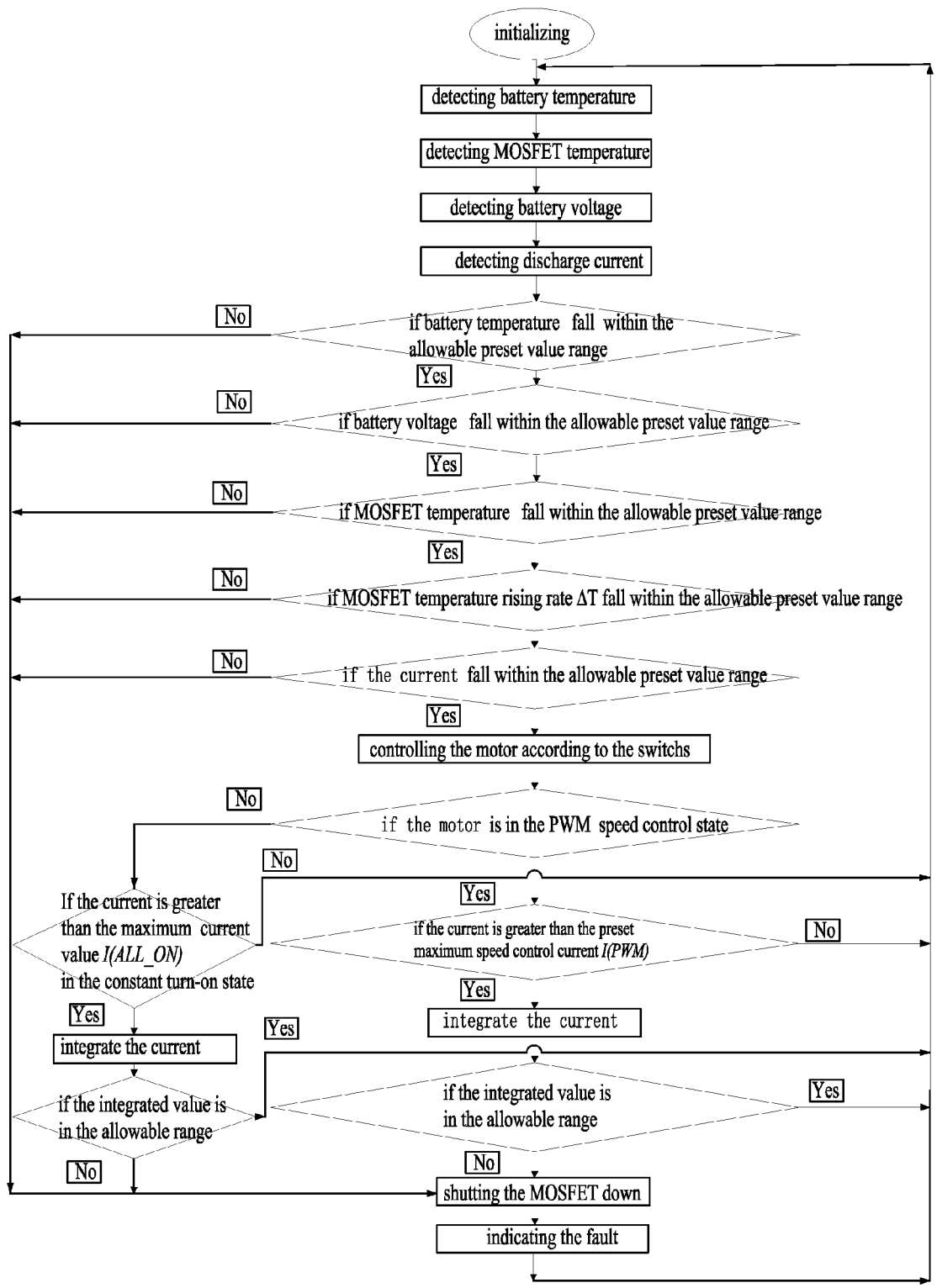
FIG. 3 is a flowchart of the over-temperature protection circuit for the DC electric tool according to the example of FIG. 1.

FIG. 3 is a flowchart of the over-temperature protection circuit for the DC electric tool according to the embodiment of the present disclosure. Upon the circuit starts working, the program is executed by firstly initializing the MCU for computation, then detects and judges the multiple parameters of the battery and MOSFET, that is, respectively detecting battery temperature, MOSFET temperature, battery voltage and discharge current, and then comparing the detected battery temperature value with the preset battery temperature range, comparing the detected MOSFET temperature with the preset MOSFET temperature range, comparing the detected battery voltage value with the preset battery voltage range, and comparing the detected discharge current value with the preset maximum discharge current value $I_{(OVER\_CURRENT)}$. Meanwhile, the real time data of the MOSFET temperature is sent to the MCU, and the MOSFET temperature rising rate $\Delta T$ is computed and compared with the preset MOSFET temperature rising rate range therein. If the above mentioned parameters of the battery and MOSFET fall within the allowable preset value range, then the program is executed downwards to the step for controlling the motor according to the inputs form the power supply switch and the speed control switch. If any one of the above mentioned parameters of the battery and MOSFET does not falls within the allowable preset value range, then the program is executed to the step for shutting the MOSFET down, carrying out the protection action, and indicating the fault.

The indication of the fault is realized by LED. In the instance of normal operation, the LED always lights up for illuminating. When the temperature of the battery or MOSFET is in an over-temperature situation, the illuminating LED flashes slowly; when the battery is over voltage or the current exceeds the preset value, the illuminating LED flashes quickly.

If the power supply switch detection circuit 5 outputs a turn-on signal, and the speed control switch detection circuit 4 outputs a speed control signal, it indicates that the electric tool is operating and in the speed control state, at this time, the comparison for the speed control current is performed. Because a larger current can result in the overheating of the MOSFET, if the measured speed control current is greater than the preset maximum speed control current $I_{(PWM)}$, the MCU integrates the current, and further compares the integrated current value with the preset current integration range. If the integrated current value is not in the allowable range, it indicates that the current rising rate is too fast, which may result in the overheating of the MOSFET, and then the program is executed to the step for shutting down the MOSFET, carrying out the protection action, and indicating the fault, at this time, the illuminating LED flashes quickly.

If the power supply switch detection circuit 5 outputs a turn-on signal, but the speed control switch detection circuit 4 does not output the speed control signal, it indicates that the electric tool is operating, but not in the speed control state, at this time, the comparison for the current is performed. If the current is greater than the maximum current value $I_{(ALL\_ON)}$ in the constant turn-on state, the current will be integrated, and if the integrated value is not in the allowable range, it indicates that the MOSFET is over current. In this case, the temperature will rise quickly up to the over-temperature state, and the program is executed to the step for shutting the MOSFET down, carrying out the protection action, and indicating the fault, at this time, the illuminating LED flashes quickly.

Under the condition that the practical application requirements of the tool are satisfied, the over-temperature protection circuit for the DC electric tool in the present disclosure combines with the MCU software control to predict whether there is over-temperature phenomenon when the power device is operating, so as to shut down the power device quickly, and effectively lower the risk of the overheating failure of the power device. In addition, the present disclosure utilizes the existing current sampling circuit, without adding additional hardware cost. Meanwhile, the over-temperature protection circuit for the DC electric tool in the present disclosure is incorporated with the conventional methods for measuring the outside temperature like the over-temperature protection and the over current protection etc, so as to protect the power device more effectively and improve the lifetime of the tool.

The electric quantity display circuit of the electric tool disclosed in the present disclosure does not limit to the contents mentioned in above embodiments and the structures shown in the attached drawings. Any obvious changes, substitutions, or modifications to the elements and devices based on the present disclosure shall be fallen into the protection scope of the present disclosure.

We claim:

1. An over-temperature protection circuit for use with an electric motor of a direct current (DC) electric tool powered by use of a battery pack, comprising:
    a current detecting circuit electrically coupled to the battery pack and detecting a battery pack discharge current;
    a power device for controlling power provided to the electric motor to thereby cause the electric motor to rotate in one of plurality of power states and wherein the plurality of power states includes a speed control power state; and
    a computation control circuit in communication with the current detecting circuit for controlling the power device as a function of the battery pack discharge current being detected by the current detecting circuit wherein the computation control circuit causes the power device to stop power being provided to the electric motor when the battery pack discharge current as detected by the current detecting circuit exceeds a first current condition value while the electric motor is being caused to rotate in a one of the plurality of power states excluding the speed control power state by the power device and causes the power device to stop power being provided to the electric motor when the battery pack discharge current as detected by the current detecting circuit exceeds a preset second current condition value as detected by the current detecting circuit while the electric motor is being caused to rotate in the speed control power state by the power device and wherein the preset second current condition value is less than the preset first current condition value.

2. The over-temperature protection circuit for a DC electric tool according to claim 1, further comprising a temperature detecting circuit in communication with the computation control circuit wherein the a computation control circuit causes the power device to stop power being provided to the electric motor when the temperature of the power device as sensed by the temperature detecting circuit exceeds a preset temperature condition value.

3. The over-temperature protection circuit for a DC electric tool according to claim 1, further comprising a temperature detecting circuit in communication with the computation control circuit wherein the a computation control circuit causes the power device to stop power being provided to the electric motor when the temperature of the battery pack as sensed by the temperature detecting circuit exceeds a preset temperature condition value.

4. The over-temperature protection circuit for a DC electric tool according to claim 1, further comprising a voltage detecting circuit in communication with the computation control circuit wherein the computation control circuit causes the power device to stop power being provided to the electric motor when a battery pack voltage detected by the voltage detecting circuit exceeds a preset voltage condition value.

5. The over-temperature protection circuit for a DC electric tool according to claim 1, wherein the preset second current condition value comprises a preset integrated current condition value and wherein, when the motor is being caused to rotate in the speed control power state and the battery pack discharge current is detected as exceeding a preset discharge current value the battery pack discharge current value is detected over time to obtain an integrated value and the power device is caused to stop power being provided to the electric motor when the integrated value is greater than the preset integrated current condition value.

6. The over-temperature protection circuit for a DC electric tool according to claim 1, wherein the preset first current condition value comprises a preset integrated current condition value and wherein, when the electric motor is being caused to rotate in a one of the power states excluding the speed control power state and the battery pack discharge current is detected as exceeding a preset discharge current value the battery pack discharge current value is detected over time to obtain an integrated value and the power device is caused to stop power being provided to the electric motor when the integrated value is greater than the preset integrated current value.

7. The over-temperature protection circuit for a DC electric tool according to claim 1, further comprising an indication circuit for indicating an operating status of the DC electric tool.

8. The over-temperature protection circuit for a DC electric tool according to claim 7, wherein the indication circuit comprises a LED light and wherein the LED light is continually illuminated when the DC electric tool has a normal operating status.

9. The over-temperature protection circuit for a DC electric tool according to claim 1, wherein the power device is a metal-oxide-semiconductor field-effect transistor (MOSFET).

10. A direct current (DC) electric tool, comprising:
a battery pack comprising at least one battery unit;
a DC electric motor connected to the battery pack and supplied power by the battery pack for driving the electric motor; and
an over-temperature protection circuit for use with electric motor, comprising:
a current detecting circuit electrically coupled to the battery pack and detecting a battery pack discharge current;
a power device for controlling power provided to the electric motor to thereby cause the electric motor to rotate in one of plurality of power states and wherein the plurality of power states includes a speed control power state; and
a computation control circuit in communication with the current detecting circuit for controlling the power device as a function of the battery pack discharge current being detected by the current detecting circuit wherein the computation control circuit causes the power device to stop power being provided to the electric motor when the battery pack discharge current as detected by the current detecting circuit exceeds a first current condition value while the electric motor is being caused to rotate in a one of the plurality of power states excluding the speed control power state by the power device and causes the power device to stop power being provided to the electric motor when the battery pack discharge current as detected by the current detecting circuit exceeds a preset second current condition value as detected by the current detecting circuit while the electric motor is being caused to rotate in the speed control power state by the power device and wherein the preset second current condition value is less than the preset first current condition value.

11. The DC electric tool according to claim 10, further comprising a temperature detecting circuit in communication with the computation control circuit wherein the a computation control circuit causes the power device to stop power being provided to the electric motor when the temperature of the power device as sensed by the temperature detecting circuit exceeds a preset temperature condition value.

12. The DC electric tool according to claim 10, further comprising a temperature detecting circuit in communication with the computation control circuit wherein the a computation control circuit causes the power device to stop power being provided to the electric motor when the temperature of the battery pack as sensed by the temperature detecting circuit exceeds a preset temperature condition value.

13. The DC electric tool according to claim 10, further comprising a voltage detecting circuit in communication with the computation control circuit wherein the computation control circuit causes the power device to stop power being provided to the electric motor when a battery pack voltage detected by the voltage detecting circuit exceeds a preset voltage condition value.

14. The DC electric tool according to claim 10, wherein the preset second current condition value comprises a preset integrated current condition value and wherein, when the motor is being caused to rotate in the speed control power state and the battery pack discharge current is detected as exceeding a preset discharge current value the battery pack discharge current value is detected over time to obtain an integrated value and the power device is caused to stop power being provided to the electric motor when the integrated value is greater than the preset integrated current condition value.

15. The DC electric tool according to claim 10, wherein the preset first current condition value comprises a preset integrated current condition value and wherein, when the electric motor is being caused to rotate in a one of the power states excluding the speed control power state and the battery pack discharge current is detected as exceeding a preset discharge current value the battery pack discharge current value is detected over time to obtain an integrated value and the power device is caused to stop power being provided to the electric motor when the integrated value is greater than the preset integrated current value.

16. The DC electric tool according to claim 10, further comprising an indication circuit for indicating an operating status of the DC electric tool.

17. The DC electric tool according to claim 16, wherein the indication circuit comprises a LED light and wherein the LED light is continually illuminated when the DC electric tool has a normal operating status.

18. The DC electric tool according to claim 10, wherein the power device is a metal-oxide-semiconductor field-effect transistor (MOSFET).

* * * * *